E. A. MAUKE.
MEASURING INSTRUMENT.
APPLICATION FILED AUG. 16, 1917.
1,266,972.
Patented May 21, 1918.
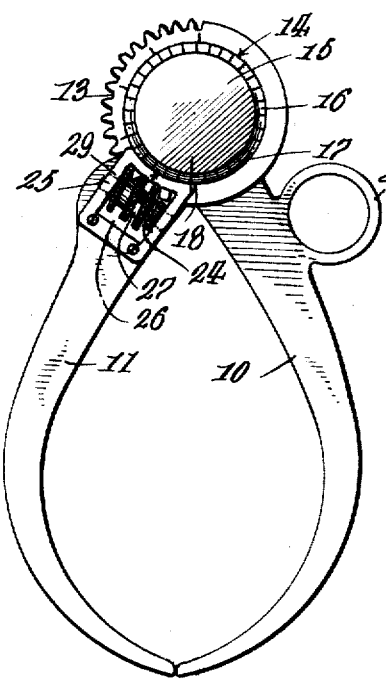
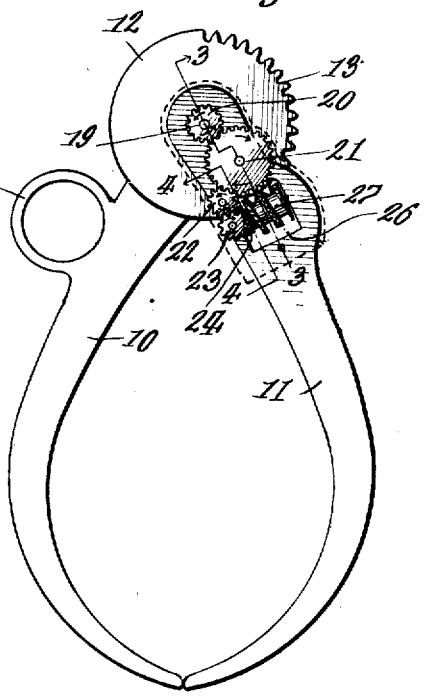
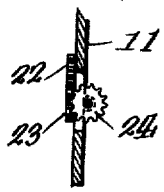
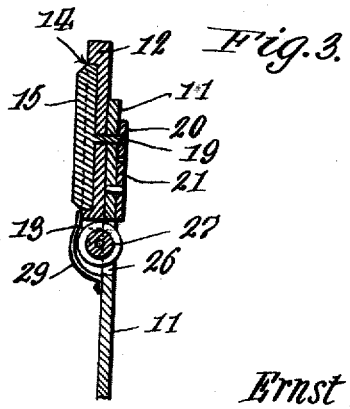
WITNESSES
Guy M. Spring
INVENTOR
Ernst A. Mauke
BY
ATTORNEY

UNITED STATES PATENT OFFICE.

ERNST A. MAUKE, OF LANCASTER, PENNSYLVANIA.

MEASURING INSTRUMENT.

1,266,972.    Specification of Letters Patent.    Patented May 21, 1918.

Application filed August 16, 1917. Serial No. 186,545.

*To all whom it may concern:*

Be it known that I, ERNST A. MAUKE, a citizen of Russia, residing at Lancaster, in the county of Lancaster and State of Pennsylvania, have invented certain new and useful Improvements in Measuring Instruments, of which the following is a specification.

This invention has relation to calipers, and has for an object to provide means for indicating the distance between the points in any adjusted position thereof.

Another object of the invention is to provide measuring calipers of the character above described and embodying means for multiplying movement of the caliper arms whereby the distance between the points may be more accurately determined.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:

Figure 1, is a view in front elevation of a pair of calipers embodying my improvement.

Fig. 2, is a view of the calipers in rear elevation, and

Figs. 3 and 4, are detail sections taken on the lines 3—3 and 4—4 respectively of Fig. 2.

With reference to the drawings, 10 and 11 indicate the arms of the calipers, in the present instance the arms being curved to permit the measuring of outside diameters, although it will be apparent that my improvement can be embodied in calipers for measuring inside diameters.

The arm 10 is provided with a circular enlargement 12 which is provided for approximately one-half its circumference with a plurality of gear teeth 13, and upon its forward face with a circular recess or depression 14 in which a disk 15 is seated. The outer periphery of the disk is beveled as at 16 and provided with a plurality of graduations 17 to be read in connection with a mark 18 upon the front face of the enlargement 12.

The disk 16 carries a shaft 19 which extends through a central opening in the enlargement, and through an opening in the arm 11 of the caliper thereby pivotally connecting the arms for relative movement. A relatively small gear wheel 20 is secured to the projecting end of the shaft 19 thereby serving to hold the arms against separation. Mounted upon the arm 11 is a relatively large idler pinion 21 which meshes with the pinion 20, and which in turn meshes with a pinion 22 of a size substantially identical with that of the pinion 20, the pinion 22 likewise meshes with a pinion 23 of similar size which in turn meshes with a pinion 24 mounted upon a shaft 25 in a plane at right angles to the axis of rotation of the pinion 23. The shaft 25 is mounted in bearings in the arm 11 and extends across an opening 26 in the arm to receive a screw 27 which meshes with the gear teeth 13 of the enlargement 12 of the calipers, whereby the arms may be moved toward and away from each other by rotating the screw 27 by means of the thumb and forefinger which are placed at opposite sides of the arm 11 of the calipers. An apertured enlargement 28 may be formed upon the arm 11 adjacent the screw 27 whereby a finger may be inserted in said apertured enlargement 28 and the screw operated thereby permitting the instrument to be held and manipulated in one hand.

In operation, during relative movement of the caliper arms induced by rotation of the screw 27, rotation of the pinion 24 with the screw is transmitted to the pinion 23 and thence to the train of gears 22, 21 and 20 to the disk 15 rotating the same. It will be apparent that owing to the relative sizes of the gears in the train the disk 15 will be rotated at a rate greater than the rate of movement of the arms and in a direction opposite the direction of rotation of the arms 10. It will be apparent that inasmuch as the limit of separation of the arms is such as to produce a half of a revolution of the enlargement 12 relative to a point on the arms 11, and that during an extreme movement of the arms, the disk 15 is rotated through a complete revolution, a greater number of graduations can be applied to the disk 15 and minute movement of the caliper arms will be more readily apparent owing to the multiplication of movement of the arms as transmitted to the disk 15.

While I have illustrated and described my invention with some degree of particularity, I realize that in practice various alterations thereover may be made, and I therefore desire to reserve the right and privilege of changing the form of the details of construction or otherwise altering the arrangement of the correlative parts without departing from the spirit of the invention or the scope of the appended claims.

Having thus described my invention what I claim as new and desire to secure by Letters Patent is:—

1. A measuring instrument including a pair of arms pivotally connected for relative movement, one of said arms having a series of segmental rack teeth, a screw mounted in the other arm engaging the rack teeth to rotate the arm relatively to automatically retain the same in locked position, a graduated element mounted for rotation on one of the arms and movable relative thereto and to the other arm and means operable by rotation of the screw for rotating said graduated element to indicate the distance between the arms.

2. A measuring instrument including a pair of arms pivotally connected for relative movement, a segmental series of rack teeth formed on one arm, a screw mounted in the other arm engaging the teeth wherehaving a plurality of graduations, and a train of gearing operable by rotation of the screw to rotate the disk and to multiply rotation thereof whereby the distance between the ends of the arms may be indicated.

3. A measuring instrument including a pair of relatively movable arms, a circular enlargement formed on one arm having one side face recessed, and centrally apertured, a graduated disk seated in said recess and having a central pin entering the aperture and passing through the other arm to connect said arms together, a pinion on the projecting end of the pin, a series of teeth formed on the enlargement, the said other arm having an opening, a screw mounted in the opening to engage the rack whereby to move the arms relatively, a pinion rotatable with the screw, a train of gearing connecting said pinion with the first mentioned means, and a gage plate having a central opening mounted over the screw and one side face concaved to engage the edge of the disk and bearing an index for coaction with the graduations of the disk.

In testimony whereof I affix my signature in presence of two witnesses.

ERNST A. MAUKE.